United States Patent [19]

Swirbel et al.

[11] Patent Number: 5,695,690
[45] Date of Patent: Dec. 9, 1997

[54] COLOR FILTER FOR A LIQUID CRYSTAL DISPLAY

[75] Inventors: Thomas J. Swirbel, Davie; Patrick M. Dunn; Joaquin Barreto, both of Coral Springs, all of Fla.

[73] Assignee: Motorola, Inc., Schaumburg, Ill.

[21] Appl. No.: 709,887

[22] Filed: Sep. 9, 1996

[51] Int. Cl.⁶ .............................. F21V 9/00; G02F 1/1335
[52] U.S. Cl. ....................................... 252/582; 349/106
[58] Field of Search ............................ 252/582; 349/106

[56] References Cited

U.S. PATENT DOCUMENTS

| | | | |
|---|---|---|---|
| 4,808,501 | 2/1989 | Chiulli | 430/7 |
| 4,957,349 | 9/1990 | Clerc et al. | 350/333 |
| 5,444,557 | 8/1995 | Spitzer et al. | 349/106 |
| 5,571,663 | 11/1996 | Hirai | 430/504 |
| 5,626,994 | 5/1997 | Takayanagi et al. | 430/7 |

*Primary Examiner*—Philip Tucker
*Attorney, Agent, or Firm*—Dale W. Dorinski

[57] ABSTRACT

A color filter for a liquid crystal display is made by depositing a layer (22) of colored dye in a pattern on a transparent substrate (20). The pattern is in pixel format, covering most of the substrate surface and leaving portions (23) of the surface between the pixels uncovered. A layer of silver halide (25) covers both the colored dye pixels and the exposed portions of the substrate surface. The silver halide layer is treated by exposing it to light so that those portions of the silver halide layer that lie directly over the colored dye pattern become transparent and those portions of the silver halide layer that lie between the pixels become black, blocking any transmitted light.

14 Claims, 1 Drawing Sheet

COLOR FILTER FOR A LIQUID CRYSTAL DISPLAY

TECHNICAL FIELD

This invention relates in general to color filters, and more particularly to color filters used for liquid crystal displays.

BACKGROUND

Color filters are used extensively in liquid crystal displays for both TV sets and computer screens, and are finding application in handheld electronics such as two way radios, pagers and cellular telephones. The addition of full color introduces several problems that add expense to the display. The most obvious is that the number of pixels and drivers must be increased by a factor of three or four to maintain the same resolution as a monochrome display. This increases driver costs and complicates manufacturing by decreasing geometries or adding crossovers. The other problem is that the production of the color filter array is a technique sensitive process and is one that is not widely practiced. Consequently, color filter arrays are now available from only a few sources and the prices for the filter plates are quite high.

Active matrix liquid crystal displays (LCD) are particularly well suited for color. Indeed, most of the active matrix products under development or in production include color by adding a color filter to the inside of the LCD cell. (Filters on the outside suffer from parallax problems due to the thickness of the glass plate.) The filters are arranged in a quad, triangular or striped pattern that mimics the way color is developed on a cathode ray tube (CRT). An individual pixel can be comprised of three or four subpixels, each of which is independently controlled to achieve the desired color.

Another problem with color filters is the low light transmission or "transmissivity" of the filters. An active matrix array with polarizers, filters, liquid crystal, and transistor array has an optical transmission factor of typically 2 to 3%. This implies that a substantial amount of light must be generated behind the display to achieve a satisfactory luminance level. While this is not a severe problem for desk-top monitors, it is for portable computers and for display applications in battery powered two way radios.

Manufacturing technology may eventually evolve to the point where costs are comparable to those of the CRT face plate phosphor. However, there are only a few suppliers of large area filter arrays, and since costs are quite high, a need exists for a color filter that can be more easily made and is less expensive.

DETAILED DESCRIPTION OF THE PREFERRED EMBODIMENT

A color filter for a liquid crystal display is made by depositing a layer of colored dye in a pattern on a transparent substrate. The pattern is typically in pixel format, and the pixels cover most of the substrate surface, leaving portions of the surface between the pixels uncovered. A layer of silver halide covers both the colored dye pixels and the exposed portions of the substrate surface. The silver halide layer is treated by exposing it to light so that those portions of the silver halide layer that lie directly over the colored dye pattern become transparent and those portions of the silver halide layer that lie directly over the exposed portions of the substrate become black, blocking any transmitted light.

Figure 1:
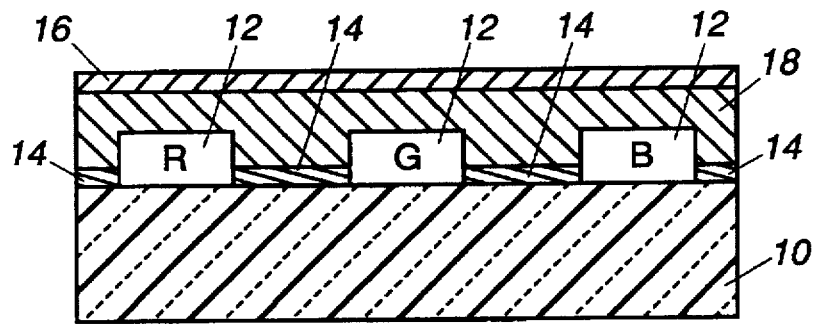
FIG. 1 is a cross sectional representation of a color filter as practiced in the prior art.

While the specification concludes with claims defining the features of the invention that are regarded as novel, it is believed that the invention will be better understood from a consideration of the following description in conjunction with the drawing figures. There are several ways to add color to a liquid crystal display. Referring now to FIG. 1, a cross-sectional representation of a color filter as practiced in the prior art, most full color filters employ red, green, and blue colors along with polarizers and a white light source. Any display that produces contrast can theoretically have color. One method of achieving full-color displays is by selectively mixing the three primary colors: red (700 NM), green (546.1 NM), and blue (435.8 NM). In order to fabricate the patterns of the various colored dyes, solutions of the color resin with the proper viscosity and solids content are spun onto a substrate 10 by dripping the solution onto the revolving substrate (1,000 to 4,000 rpm). The substrate is then put into a beta stage bake at 170° to 180° C. for 30 minutes. Photoresist is coated over the layer, baked, and the pattern is exposed through a photomask and developed. The exposed dye layer is developed away to create the dye layer pattern 12. The photoresist is stripped from the substrate and the remaining dye layer pattern is cured at 200° to 250° C. for 60 minutes. The process is repeated for the other two colors. Alternatively, if the filters are photoreactive only to UV light, they can be used as both the photoresist and the color filter. The dyed photoresist filter is deposited, exposed through a photomask, and the unwanted photoresist cleaned, leaving the dyed photoresist in place.

One widely used dye material for LCD color filters is dichromated gelatin. Dichromated gelatin doped with a photosynthesizer is patterned by photolithography. The patterned material is then dyed by immersion into a bath of reactive or acid dyes. Although this material is widely used, it suffers from a low degree of light stability, low thermal stability, and low throughput due to the complex processing. With dyed gelatin, the pH of the dye bath, the temperature, the film thickness, and the chemical composition of the gelatin are important variables. Gelatin itself is a poorly characterized organic material made from animal cartilage (protein). A better filter material developed by Brewer Science Inc. (Rolla, Mo.) employs dyed polyimides as color filters. Polyimides are known for their stability at temperature as well as for their chemical durability. The dielectric properties of polyimides are also very well suited to the processing conditions used to fabricate liquid crystal displays. The selected dyes are very soluble in the solvent (N-methylpyrolidone or NMP) used for polyimide application and insoluble in the solvent used for removing photoresist (2-ethoxyethyl acetate). The dyed polyimide layer is formed by mixing a solution of polyamic acid in NMP with 2-methoxyethyl ether and an appropriate dye and spinning the solution on a substrate. The solution requires curing at around 280° C., imposing a severe constraint on the dye material. However, an additional benefit of the polyimide filter system is that the filters can be used as aligning layers on the inside of the LC cell.

In addition to the primary filters, a color display usually has a black mask 14 deposited in the optically inactive areas (i.e., the areas between the pixels) to prevent light leakage. Black matrix materials and their deposition are by no means trivial. Alignment between the color filter, ITO pixel electrode, and black mask are extremely important, as misalignments in black mask deposition will reduce aperture ratio by covering the color filter areas, and may cause light leakage ,which reduces viewability. The black mask material should have a low reflectance to optimize the contrast ratio. Several methods have been used in the art to deposit and pattern the mask material, and these are constrained by, among other variables, the temperature sensitivity of the dyes and the requirements for a smooth surface. Chromium dioxide is typically used as a mask in conventional filters, and is applied directly onto the surface of the substrate to fill the spaces between the color filter pixels.

The insulating properties of color filter material mandate that the conductive ITO layer 16 be deposited over the filters, rather than under them (i.e., not directly on the glass substrate 10). This means that the filter materials must be capable of enduring any elevated temperatures used during the ITO deposition process. A planarization layer 18 is typically placed between the dye layer pattern 12 and the ITO layer 16. The planarization layer 18 serves to passivate the color filters so that they do not contaminate the liquid crystal material contained within the display cell, and acts as an insulator between the electrically conductive ITO and the dye layer pattern. The filter surfaces must be as smooth as possible to maximize color purity and to minimize light dispersion. They must adhere strongly to the pixel surface and not be overly photosensitive. It is estimated that in a display with a filter roughness (difference between minimum and maximum thickness) of 0.5 micron, the contrast is halved, and if the roughness is 1.0 micron, the contrast is reduced by a factor of six. Ideally, the roughness should be kept below 0.1 micron. The most straightforward means of flattening the filters in the prior art is to deposit a flat transparent overcoating material (the planarization layer 18) that is about 10 times as thick as the filter. But this additional deposition step increases the chance of contamination or damage, and transfers the problem from filter uniformity to overcoat uniformity.

Figure 2:
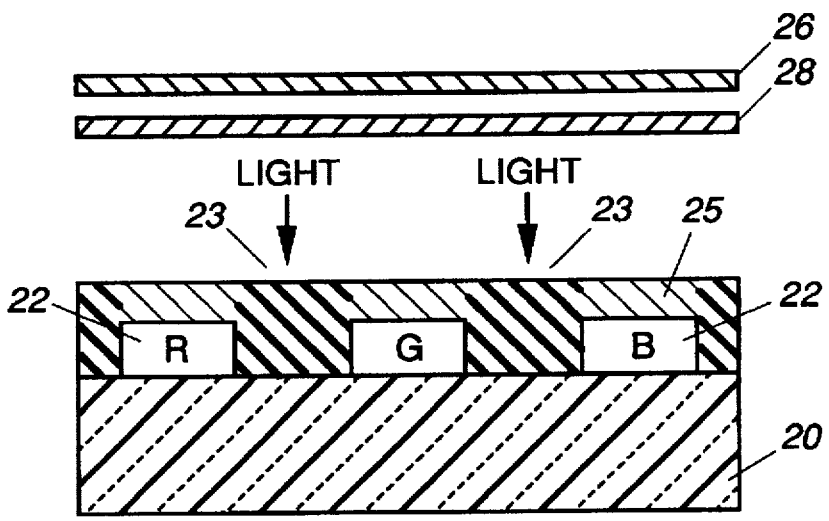
FIG. 2 is a cross sectional representation of a color filter in accordance with the invention.

Referring now to FIG. 2, a cross sectional representation of a color filter in accordance with the invention, a dye layer pattern 22 is deposited on a transparent substrate 20 in conventional manner. It should be noted that in the preferred embodiment the dye layer 22 consists of red, green and blue pixels, but may also consist of a single color, and that color may be a color other than red, green or blue. For example, it may be desirable to manufacture a color filter plate that creates a monochrome display, or it may be desirable to use patterns shaped as icons rather than simply using an array of pixels. Each of the pixels in the dye layer pattern are separated by a space 23 between them. This space is subsequently filled with a black matrix material that serves to block light and improve contrast. In the instant invention, the space 23 is filled by overcoating the dye layer pattern 22 and the substrate 20 with a layer 25 of silver halide (e.g. silver bromide, silver chloride, silver fluoride, or mixtures thereof). Silver halide is well known in the photographic arts as a material that can create distinct black patterns on a transparent background when subjected to appropriate conditions of light and chemistry. The silver halide layer not only covers the dye layer pattern, but fills the spaces 23 between the pixels in the pattern, and creates a planarizing effect over the color dye layer. When the silver halide layer 25 is exposed to proper light conditions, through a photomask, for example, and then developed and fixed in the proper chemistry, the spaces 23 between the pixels become black (i.e. opaque to light), while the spaces that overlie the respective pixels turn clear and are transparent to light, allowing the color dyes to be visible through the transparent portions. In the drawing figures, this black/transparent change in the silver halide layer 25 is depicted by the use of heavier lines in the spaces 23 between the dye pixels 22, and thinner lines in the areas directly over the dye pixels.

This structure eliminates all the processing steps that are employed in the conventional art, and provides a black matrix between the pixels that can be easily controlled. One alternative embodiment uses the pixels in the color dye layer as the photomask, eliminating the need to a separate photomask. In this instance, the silver halide layer is exposed from the backside of the substrate, and the pixels in the dye layer act as the photomask, shielding those portions of the silver halide layer that are directly above the dye pattern from the light. Thus, the black matrix is precisely positioned between the pixels, with zero misregistration.

The ITO layer 26 can then be placed directly on the silver halide layer, as silver halide is an electrical insulator. Or, optionally, another layer of a passivating material 28 can be placed over the silver halide layer, if desired.

Figure 3:
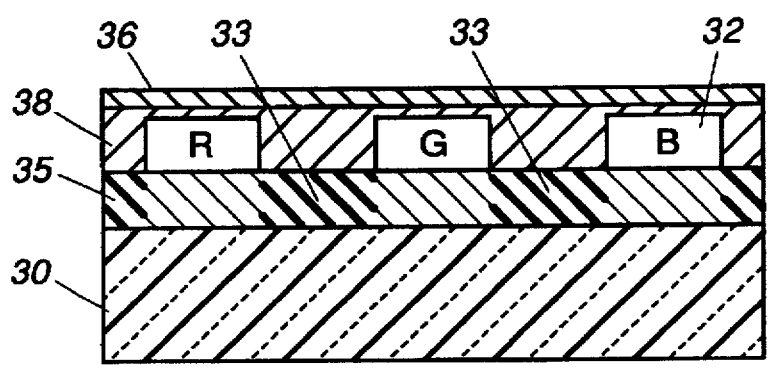
FIG. 3 is a cross sectional representation of a color filter in accordance with an alternate embodiment of the invention.

In an alternate embodiment of the invention as depicted in FIG. 3, the silver halide layer 35 is placed directly on the substrate 30. A dye layer pattern 32 is deposited on the silver halide layer 35 in conventional manner. Each of the pixels in the dye layer pattern are separated by a space 33 between them. This space is subsequently blocked by the black silver halide material that serves to block light and improve contrast. When the silver halide layer 35 is exposed to proper light conditions, through a photomask, for example, and then developed and fixed in the proper chemistry, the spaces 33 between the pixels become black, and are opaque to light, while the spaces that are underneath the respective pixels turn clear and are transparent to light, allowing the color dyes to perform.

This structure also eliminates many processing steps and disadvantages that are inherent in the conventional art, and provides a black matrix between the pixels that can be easily controlled. One alternative embodiment uses the pixels in the color dye layer as the photomask, eliminating the need for a separate photomask. In this instance, the silver halide layer is exposed from the topside of the substrate, and the pixels in the dye layer act as the photomask, shielding those portions of the silver halide layer that are directly below the dye pattern from the light. Thus, the black matrix is precisely positioned between the pixels, with zero misregistration.

A passivating layer 38, for example, silicon dioxide, is then deposited on the color dye layer 32, and the ITO layer 36 can then be placed on the passivating layer. An example of a color filter made in accordance with the invention will now be shown.

EXAMPLE

Six inch by six inch optical grade soda-lime glass was coated with a 5 micron to 20 micron thick silver halide emulsion. The emulsion is type CKRM113 manufactured by Kodak Corporation. The emulsion coated plates are sold under the name Precision Line LPFA. A black matrix was designed to form a series of vertical and horizontal lines 0.02 mm wide on 0.125 mm centers. This matrix pattern was then directly written on the emulsion coated glass substrates using a Gerber laser photoplotting system. After exposing the desired image the emulsion was developed in Kodak Ultraline developer solution, rinsed, and fixed or stabilized in Kodak Ultraline fixer solution. The result was a black image comprising 0.02 mm lines with a 0.125 mm pitch on a vertical and horizontal grid where the laser photoplotter exposed the emulsion. The unexposed areas were clear. Next the color filter images were defined. The color filter materials were red, blue, and green dyed polyimides sold by Brewer Science under the name PIC Color Filters. First, the red polyimide was spun on the substrate at approximately 3,000 RPM and dried in a convection oven at 120° C. for 20 minutes. A layer of AZ4620 positive photoresist from Hoechst-Celanese was spun over the polyimide layer at 4,000 RPM and dried at 85° C. for 30 minutes in a convection oven. Next, the substrate was imaged through a phototool such that the UV 365 nm radiation exposed all areas except where the red image was desired, developed in dilute sodium borate, rinsed, and dried. The photoresist was subsequently stripped in a solution of equal parts of isopropyl alcohol and butyl acetate, and the polyimide cured in a convection oven at 200° C. for 1 hour. Second, the blue polyimide was spun on the substrate at approximately 3,000 RPM and dried in a convection at 120° C. for 20 minutes. A layer of AZ4620 photoresist was spun over the polyimide layer at 4,000 RPM and dried at 85° C. for 30 minutes in a convection oven. Next, the substrate was imaged through a phototool such that the UV 365 nm radiation exposed all areas except where the red and blue images were desired, developed in dilute sodium borate, rinsed, and dried. The photoresist was subsequently stripped in a solution of equal parts of isopropyl alcohol and butyl acetate, and the polyimide cured in a convection oven at 200° C. for 1 hour. Finally, the green polyimide was spun on the substrate at approximately 3,000 RPM and dried in a convection at 120° C. for 20 minutes. A layer of AZ4620 photoresist was spun over the polyimide layer at 4,000 RPM and dried at 85° C. for 30 minutes in a convection oven. Next, the substrate was imaged through a phototool such that the UV 365 nm radiation exposed all areas except where the red, blue and green images were desired, developed in dilute sodium borate, rinsed, and dried. The photoresist was subsequently stripped in a solution of equal parts of isopropyl alcohol and butyl acetate, and the polyimide cured in a convection oven at 225° C. for 30 minutes. The cured thickness of the colored filter layers was approximately 1 micron. After cure, a 5 micron thick polyimide planarization layer was applied over the dye layer and cured at 225° C. for 1 hour. Indium-tin oxide was subsequently deposited on top of the planarization layer and the desired electrode pattern formed.

In summary, a color filter for use with liquid crystal displays has been made that is cheaper and easier to make compared to prior art filters, and eliminates the misalignment problems experienced in the prior art. While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A color filter for a liquid crystal display comprising:
 a transparent substrate;
 a layer of colored dye deposited in a pattern on the substrate and covering first portions of the substrate, second portions of the substrate remaining uncovered;
 a silver halide layer covering both the layer of colored dye and the second portions of the substrate; and
 the silver halide layer treated in a manner sufficient to cause the portions of the silver halide layer overlying the colored dye pattern to be transparent and the portions of the silver halide layer overlying the second portions of the substrate to be black.

2. The color filter as described in claim 1, further comprising a planarization layer on top of the silver halide layer.

3. The color filter as described in claim 2, further comprising a layer of ITO on top of the planarization layer.

4. The color filter as described in claim 1, wherein the layer of colored dye comprises red, green, and blue pixels.

5. The color filter as described in claim 1, further comprising a layer of ITO on top of the silver halide layer.

6. A color filter for a liquid crystal display, comprising:
 a transparent substrate having a surface;
 colored dye pixels deposited in a pattern on the substrate surface such that a space is formed between each adjacent pixel;
 a silver halide layer covering the colored dye pixels and filling the spaces between the pixels; and
 the silver halide layer treated in a manner sufficient to make the portions of the silver halide layer that directly overlie the colored dye pixels transparent and to make the portions of the silver halide layer that fill the spaces between the pixels black.

7. The color filter as described in claim 6, further comprising a planarization layer of $SiO_2$ on top of the silver halide layer.

8. The color filter as described in claim 7, further comprising a layer of ITO on top of the planarization layer.

9. The color filter as described in claim 6, wherein the colored dye pixels comprises red, green, and blue pixels.

10. A color filter for a liquid crystal display, comprising:
 a transparent substrate;
 a silver halide layer deposited on the substrate;
 colored dye deposited in a pattern on the silver halide layer such that portions of the silver halide layer remain uncovered by the colored dye;
 the silver halide layer treated in a manner sufficient to cause the portions of the silver halide layer that are not covered by the colored dye to be black.

11. The color filter as described in claim 10, further comprising a planarization layer on top of the colored dye.

12. The color filter as described in claim 11, further comprising a layer of ITO on top of the planarization layer.

13. The color filter as described in claim 10, wherein the colored dye comprises red, green, and blue pixels.

14. The color filter as described in claim 10, further comprising a layer of ITO on top of the colored dye.

* * * * *